Dec. 12, 1939.  A. H. OELKERS  2,183,504
TRUCK
Filed April 1, 1938  4 Sheets-Sheet 1
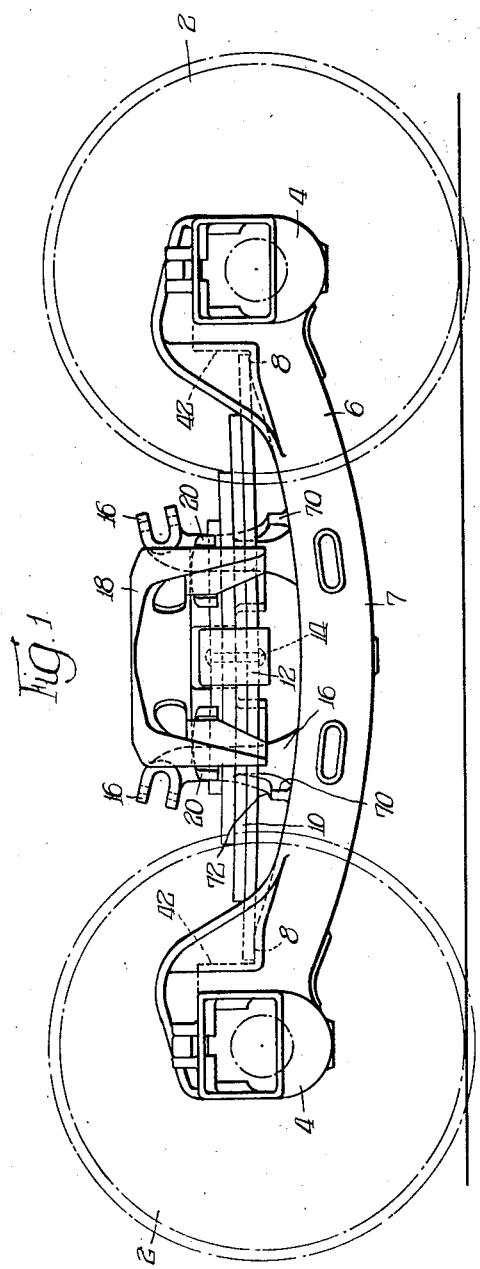
Inventor:
Alfred H Oelkers.
By ... Atty Dec. 12, 1939.　　A. H. OELKERS　　2,183,504
TRUCK
Filed April 1, 1938　　4 Sheets-Sheet 2
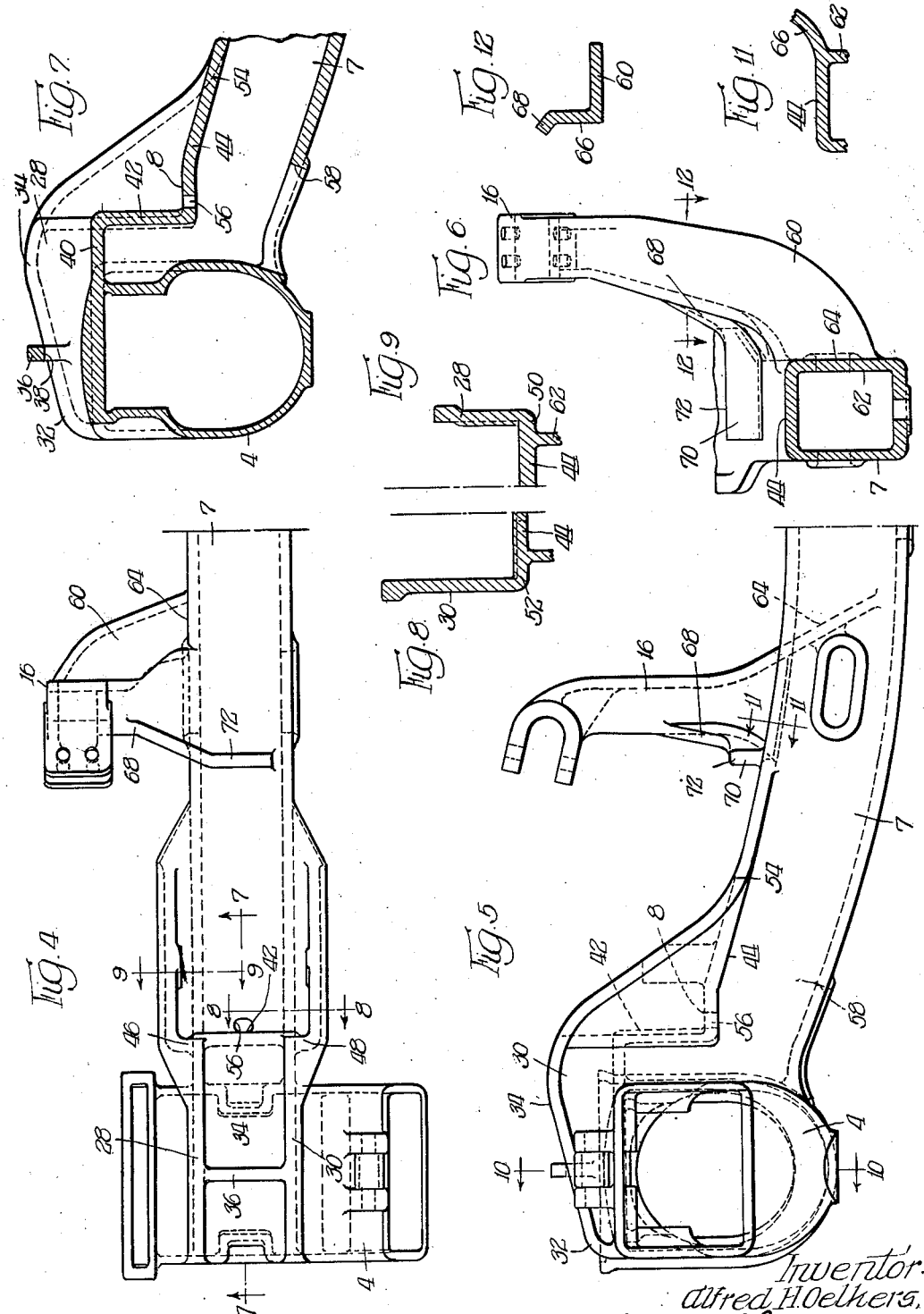
Inventor:
Alfred H. Oelkers,
By Orin O.B. Garner
atty.

Dec. 12, 1939.  A. H. OELKERS  2,183,504
TRUCK
Filed April 1, 1938   4 Sheets-Sheet 3
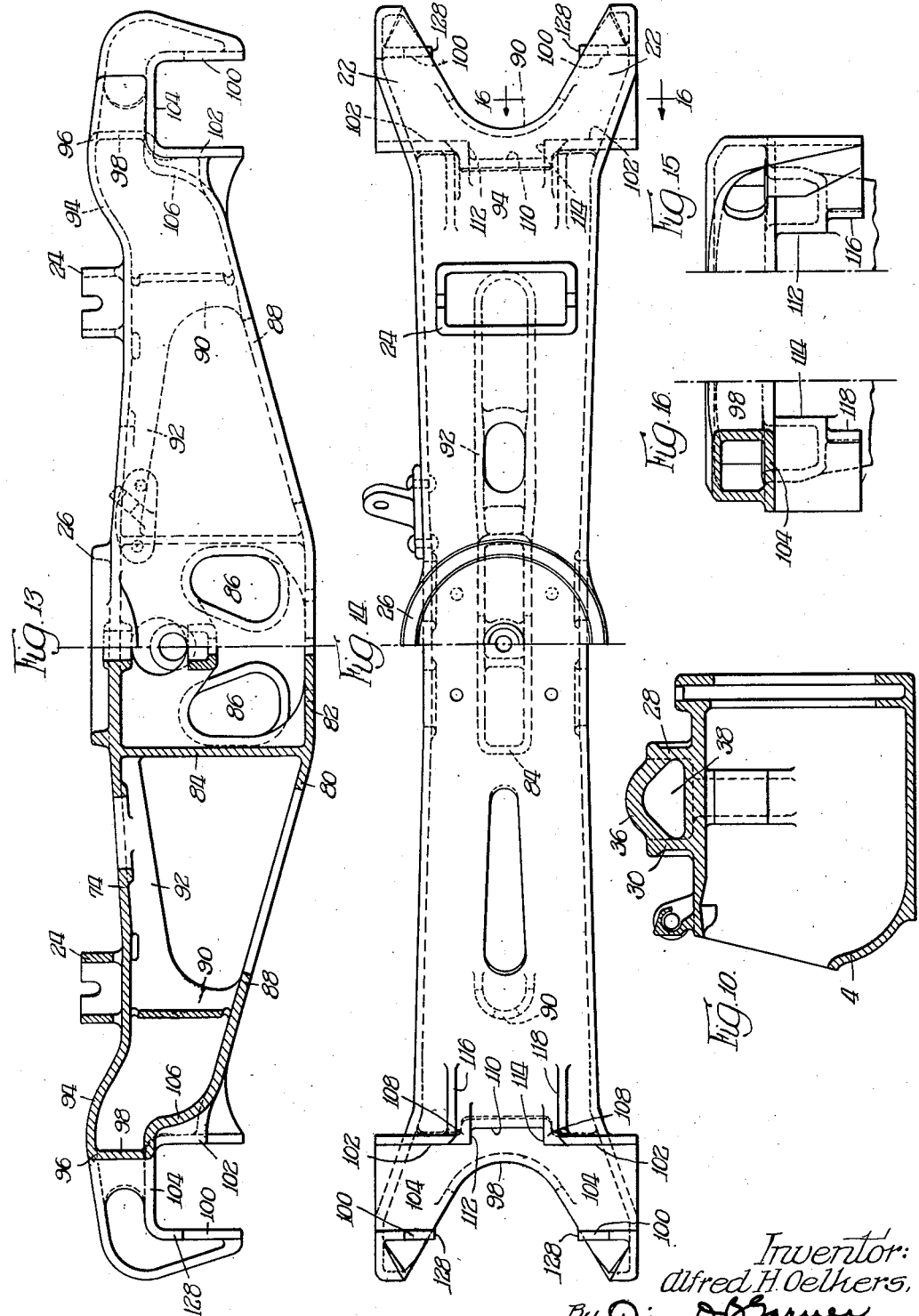
Inventor:
Alfred H Oelkers,
By [signature] atty Dec. 12, 1939. A. H. OELKERS 2,183,504
TRUCK
Filed April 1, 1938 4 Sheets-Sheet 4
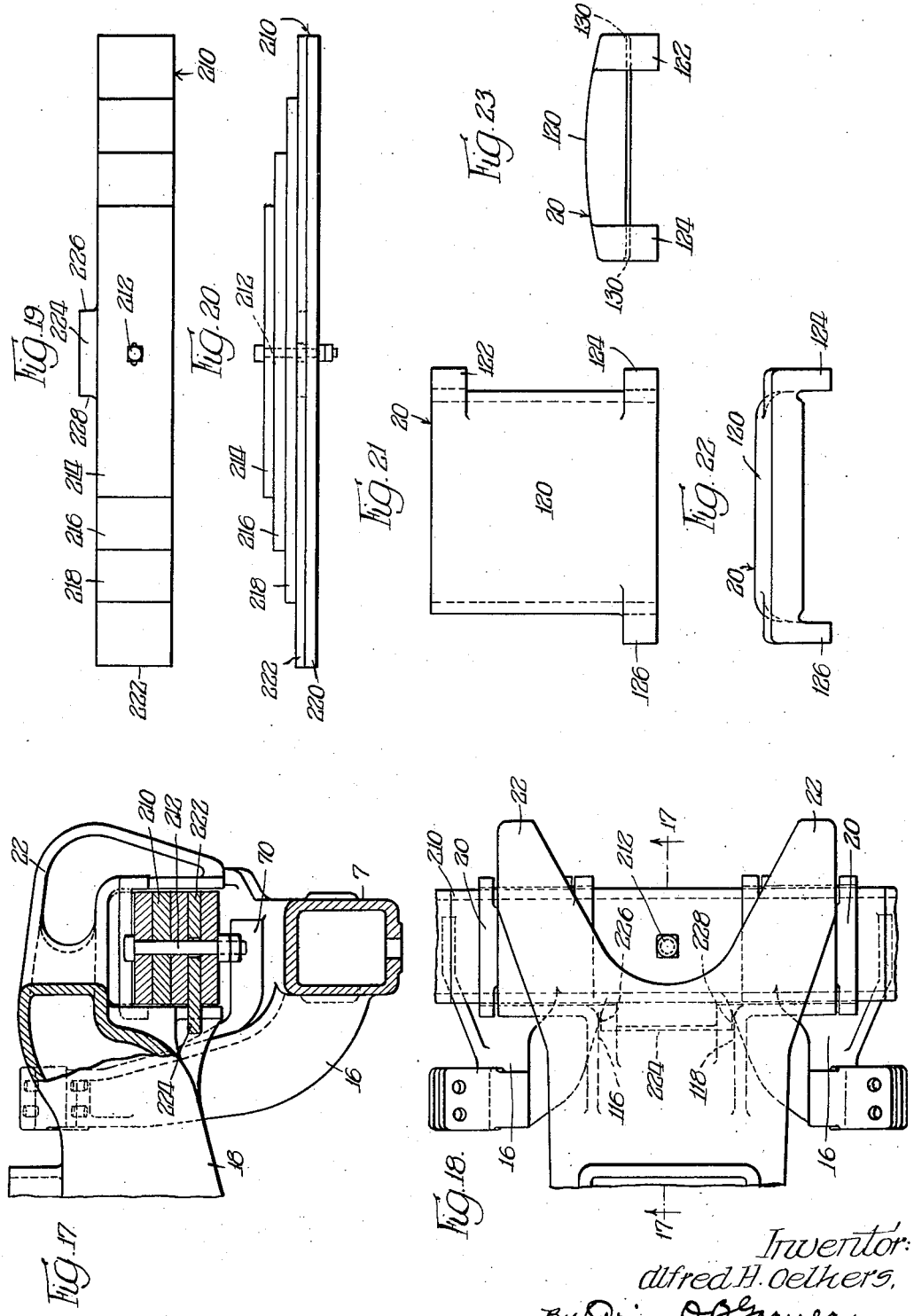

Patented Dec. 12, 1939

2,183,504

UNITED STATES PATENT OFFICE 2,183,504

TRUCK

Alfred H. Oelkers, Chicago, Ill., assignor to American Steel Foundries, Chicago, Ill., a corporation of New Jersey Application April 1, 1938, Serial No. 199,353

8 Claims. (Cl. 105—197.2)

My invention relates to a four wheel railway truck and more particularly to a novel type thereof wherein the method of cooperation between the spaced side frames and the load carrying member which supports the car body is of novel form.

An object of my invention is to design a four wheel truck wherein the side frame will be free of imposed load except adjacent the journal ends thereof whereat it is supported on the associated wheel and axle assemblies.

A different object of my invention is to construct a four wheel truck arrangement wherein the resilient means and the snubbing means constitute a single member, said member being of a most simple form.

A further object of my invention is to design a four wheel truck wherein a beam-like member will constitute the resilient means as well as the snubbing means and wherein flat plates may be used, thus eliminating the usual cambering operation.

My invention also contemplates a four wheel truck wherein resilient means will constitute the sole connection between the load carrying member and the spaced side frames.

There is also comprehended in my invention a novel method of transferring the end thrust from the load carrying member to the side frame, said end thrust being transmitted through the before-mentioned resilient member by a novel connection between said resilient member and the bolster or load carrying member.

A yet further object of my invention is to design a four wheel truck wherein the resilient means and the snubbing means are incorporated in a member in the form of a beam-like construction wherein the separate leaves are of the simplest possible form consisting simply of straight spring steel not requiring any forging operation such as the formation of nibs or upsetting or special bending or cambering such as is commonly resorted to.

My invention also comprehends a novel beam-like member of a design particularly suitable for transmitting lateral thrusts from the load carrying member of a four wheel truck to the side frame thereof, said member comprising a plurality of flat plates certain of which are designed to transmit end thrusts in addition to the lateral thrusts and vertical loads normally imposed upon the member as a unit.

Another object of my invention is to design a four wheel truck with a side frame comprising a resilient beam-like member and a rigid beam so arranged that the resilient beam receives the entire load from the car body and transmits it to the rigid beam adjacent its ends under normal conditions but receives additional support from the rigid beam at spaced points intermediate its ends whenever the load or shock imposed upon the resilient beam is sufficient to reach a pre-determined safe fiber stress for the resilient beam.

Figure 1 is a side elevation of my novel form of truck;

Figure 2 is an end view thereof partly in section, the section being taken substantially in the vertical plane bisecting the truck transversely;

Figure 3 is a fragmentary top plan view of the truck arrangement shown in Figures 1 and 2;

Figure 4 is a top plan view of the side frame, only one-half of the frame being shown inasmuch as the structure is bisymmetrical;

Figure 5 is a side elevation of the side frame;

Figure 6 is a sectional view through the side frame, the section being taken substantially in the vertical plane bisecting the frame transversely;

Figure 7 is a fragmentary sectional view taken substantially in the vertical plane bisecting the side frame longitudinally and as indicated by the line 7—7 of Figure 4;

Figures 8 and 9 are transverse sections through the side frame in vertical planes, the sections being taken substantially in the planes indicated by the lines 8—8 and 9—9 of Figure 4;

Figure 10 is a transverse vertical section through the journal box portion of the side frame substantially in the plane indicated by the line 10—10 of Figure 5;

Figure 11 is a sectional view through the side frame structure at the juncture of the principal member with the brake hanger bracket, the section being taken substantially in the plane indicated by the line 11—11 of Figure 5;

Figure 12 is a horizontal section through the brake hanger bracket portion of the side frame structure, the section being taken substantially as indicated by the line 12—12 of Figure 6;

Figure 13 is an elevational view of the bolster, half in section, the section being taken in the vertical plane which bisects the bolster longitudinally;

Figure 14 is a plan view of the bolster, the right half thereof showing the top plan and the left half the bottom plan;

Figure 15 is a half end view of the bolster;

Figure 16 is a sectional view through the bolster end, the section being taken in the transverse vertical plane substantially as indicated by the line 16—16 of Figure 14;

Figures 17 and 18 show a modified arrangement for connecting the bolster end to the resilient beam-like member or flat leaf spring in a form to transmit lateral thrusts in a novel manner and wherein Figure 17 is a sectional view through the truck structure in the vertical plane which bisects the truck transversely and substantially as indicated by the line 17—17 of Figure 18 and Figure 18 is a fragmentary top plan view of the modified truck arrangement, the view being taken at the point of connection between the side frame and bolster;

Figure 19 is a top plan view of the resilient member used in the modified truck arrangement;

Figure 20 is a side elevation thereof; and

Figures 21, 22 and 23 show the loading block through which the load of the bolster is imposed upon the resilient member and wherein Figure 21 is a top plan view thereof, Figure 22 is a side elevation, and Figure 23 an end elevation.

Describing my novel four wheel truck arrangement in more detail and referring for the moment more particularly to the general arrangement shown in Figures 1, 2 and 3, it may be observed that the truck comprises the usual spaced wheel and axle assemblies 2, 2, the journal ends of which are connected in the ordinary manner to the journal box portions 4, 4 of the rigid side frame 6 having the central arcuate portion 7, the detail of said side frame being hereafter fully described. The central arcuate portion is a box-like member of rectangular section (Figure 6), said portion being of slightly arcuate form, the curve of said arc being substantially uniform throughout its length. Adjacent each journal box 4 is formed the spring seat 8 upon which may be positioned the opposite ends of the lower leaf or leaves of the resilient beam or flat leaf spring 10, said leaves in the modification here under consideration being secured together by the central band 12 forged over the central rivet 14. Centrally of the side frame 6 are formed the spaced brake hanger brackets 16, 16. On either side of the spring band 12 is imposed the load from the bolster 18, the load being transmitted through loading blocks 20, 20 and the bifurcated end of the bolster 18 having spaced jaws 22, 22 of a form best shown in Figures 13 to 16 inclusive, said jaws forming a means of connection between the bolster 18 and the resilient beam 10. The bolster has the usual side bearings 24 and the center bearing 26 designed to cooperate with the complementary bearing on the supported car body.

The detail of the rigid side frame structure is shown in Figures 4 to 12 inclusive. The juncture of the arcuate central portion 7 with the journal box 4 at the end of the side frame is reinforced in a novel manner by the vertical parallel inner and outer lateral flanges 28 and 30, said flanges extending across the top of the journal box as best seen in Figure 7 and having a minimum height as at 32 at the outer edge or extremity of said journal box and rising to a maximum height approximately over the inner edge of the journal box as at 34, said flanges being reinforced by the arched bar 36 which joins them over the central portion of the journal box, thus forming the aperture 38 as a convenient means for receiving a lifting tool. The top wall of the journal box is extended inwardly as indicated at 40 (Figure 7) to merge with the vertical wall 42 forming an abutment for the end of the member 10 which is positioned on the before-mentioned seat 8 on the top chord 44 of the arcuate member 7. The flanges 28 and 30 extend over the inner edge of the journal box and at their junctures with the lateral wall 42 the space between them is widened as at 46 and 48 (Figure 4) to accommodate the end of the member 10, the top chord 44 being widened in the vicinity of the spring seat 8 and merging with the vertical flanges 28 and 30 as at 50 and 52 (Figures 8 and 9). The space between said walls or flanges 28 and 30 inwardly of the lateral wall 42 is substantially equal to the width of the member 10. The flanges 28 and 30 are tapered off to merge with the top chord 44 as at 54, the spring seat 8 thus being substantially closed in a three-sided pocket defined by the vertical flanges 28 and 30 and the lateral end wall 42. At the juncture of the wall 42 with the chord 44 is formed the drainage aperture 56 (Figure 7) and immediately therebelow in the bottom chord is formed the relatively large core-removing aperture 58 adjacent the juncture of said bottom chord with the journal box 4.

The structure of the brake hanger bracket and the manner in which it merges with the side frame structure is best seen from a consideration of Figures 4, 5 and 6. The bracket is of a general L section, the leg 60 of which merges with the inner wall 62 of the member 7 as best seen at 64 (Figures 5 and 6) and the other leg 66 of said L being continuous with the top chord 44 of the member 7 as best seen in Figure 11. The member 66 is reflanged as at 68 to merge with the upstanding flange 70 formed on the top chord 44, the top edge of said flange having a substantially horizontal portion as indicated at 72 providing a suitable abutment for the member 10 in the event said member should be subjected to emergency loading. In normal operation the member 10 never abuts the flange 70.

To those skilled in the art it will be apparent that the rigid member 7 is of a form to develop maximum strength with minimum weight of metal in a member so loaded. In other words, the member 7 is arcuate in form and rectangular in section whereby I secure maximum value of the metal used in a structure loaded primarily at or adjacent its ends as is this side frame.

My novel bolster is shown in detail in Figures 13 to 16 inclusive. It comprises a central portion of well known generally box-like form having the substantially horizontal top chord 74 with the side bearings 24, 24 and the center bearing 26 designed to cooperate with a complementary bearing on the supported car body. The bottom chord 80 is substantially horizontal at the central portion 82 underlying the centerpost 84 which is integrally formed with the top and bottom chords, said centerpost as well as the side walls of the bolster having the openings 86, 86 conveniently arranged for brake rods. The lateral portions of the bottom chord 80 slope upwardly as at 88 to the end portions of the bolster which are of novel form. Underlying the side bearings 24, 24 are the reinforcing ribs 90, 90, the upper portions of which are extended longitudinally of the bolster as at 92, 92, thus reinforcing the upper chord 74. The top chord 74 merges with the bolster end along an upwardly curved portion 94 and at the top of said curved portion as at 96 merges with the vertical end wall 98 of arcuate form, said wall forming a throat-like portion wherein merge the two legs of the before-mentioned bifurcated end. Each portion of said bifurcated end is of jaw-like form best seen in Figure 13 and comprises the vertical outer wall 100 and the vertical inner wall 102 forming lateral abutments for the member 10 which extends therebetween, also the top wall 104 against which may be seated the loading plate 20 as best illustrated in Figures 1 and 3, said top wall 104 extending beyond the vertical wall 98 and merging with the diagonal portion 88 of the bottom chord of the bolster proper through the arcuate portion 106 (Figure 13). The walls 102 merge with the arcuate portion 106 through offsets at 108 and between said offsets is formed the rectangular recess 110 for the reception of the band 12 of the member 10, the opposite edges of said band having abutment against shoulders as at 112 and 114 whereby thrusts both laterally and longitudinally may be transmitted between the bolster and said spring. Below the shoulders 112 and 114 and offset outwardly therefrom are formed the spaced shoulders 116 and 118 (Figures 15 and 16) also forming abutments for a modified form of member to be hereafter more fully described.

The loading block through which the load from the bolster is imposed upon the member 10 is shown in Figures 21, 22 and 23. It comprises a solid block of metal of generally rectangular shape, the main body of which has the arcuate top 120 so formed in order to equalize the load from the bolster over the area of the spring upon which the loading block is supported. The outer edge of the loading block has the flanges or lugs 122 and 124 down-turned over the top leaf of the member 10 and the rear edge has the similar lug 126, all of said lugs serving to position said loading block with respect to said member, said lugs also serving to position said loading block with respect to said bolster end as best seen in Figure 3, the lug 122 having abutment with the shoulder 128 (Figure 14) and the lugs 124 and 126 abutting respectively the lateral edges of the outer and inner walls 100 and 102 of the jaw portion of the bolster end. The lateral edges of the loading plate are formed with a radius as at 130, 130 in order that the load from the bolster may be imposed upon the bending top leaf of the member 10 at two spaced points without sharply digging thereinto. It will be apparent of course that when a substantial load has been imposed from the bolster through the loading block on the member, that the bending of the member will cause the load to be imposed upon the top leaf thereof at spaced points, namely, adjacent the bottom lateral edges 130, 130 of the loading block.

To those experienced in the art it will be apparent that in the modification of my invention thus far described, the loads carried by the bolster are imposed upon the member through the loading blocks and thence to the rigid side frame through the spring seats adjacent the journal ends of said side frames. It will also be clear that all lateral thrusts and end thrusts are transmitted from the bolster to the rigid side frame member through the resilient member. Thrusts longitudinally of the truck are transmitted between the bolster and the member by abutment of the central band with the shoulders in the jaw end of the bolster as already described. It will be clear also that the rigid side frame member is free of loading at points intermediate the spring seats adjacent the journal boxes except in case of unusual emergency when heavy overloading may occur. In such emergencies the member is supported at intermediate points as previously explained.

The modification of my novel truck structure shown in Figures 17 and 18 is substantially identical with that already described except for the structure of the resilient beam-like member or flat leaf spring and the manner in which it is engaged by the bolster end. The form and detail of this novel member is shown in Figures 19 and 20. It will be seen that the member generally designated 210 comprises straight flat plates superimposed upon one another in the usual manner and secured by the bolt and nut assembly 212, said bolt projecting through aligned openings centrally formed in the plates. In this modification my novel arrangement comprises a plurality of plates 214, 216, 218 and 220 of equal thickness and varying in length from the relatively short top leaf 214 to the longest bottom leaf 220. Except for tolerances, the length of the bottom leaf is substantially equal to the distance beween the walls 42, 42 defining the extremities of the spring seats 8, 8 at the opposite ends of the side frame. Interposed between the bottom leaf 220 and the next leaf of normal thickness is the leaf 222 having a length equal to that of the longest leaf 220 and a width equal to that of the remainder of the leaves but of lesser thickness. The thin leaf 222 has at the mid-point thereof a widened portion presenting shoulders 226 and 228 for abutment respectively against the shoulders 118 and 116 (Figures 15 and 16) at the jaw end of the bolster. In this arrangement it will be apparent, therefore, that thrusts endwise of the truck will be transmitted beween the bolster and the side frame through the shoulders 226 and 228 on the widened portion of the thin leaf 222 of the member 210. As is well known to those skilled in the art, the member 210 when subjected to a load will bend as a unit inasmuch as the leaves are bound together. When such bending takes place, the relatively thin leaf 222 will be subjected to less fiber stress due to such deflection than will the remainder of the leaves which are of greater thickness. For this reason the thin plate, being subjected to less unit stress due to bending under the vertical load, is able to withstand the additional forces resultant from the longitudinal thrusts above referred to in transmitting loads from the bolster. It will thus be seen that I have provided a novel arrangement which permits thrusts to be transmitted beween the side frame and the bolster without overloading or subjecting to too great unit stress the member which transmits said thrusts.

In this improved type of truck I have devised an arrangement wherein the entire assembly of truck parts is comprised of two wheel and axle assemblies, two side frames, a resilient beam or flat leaf spring superposed upon each side frame and bolster, tying together the side frames through the medium of said resilient beam. This structure presents maximum simplicity and maximum economy in a railway truck.

It is to be understood that I do not wish to be limited by the exact embodiments of the invention shown which are merely by way of illustration and not limitation as various and other forms of the device will of course be apparent to those skilled in the art without departing from the spirit of the invention or the scope of the claims.

I claim:

1. In a four wheel railway truck, a side frame structure of generally arcuate shape and box section having integrally formed journal boxes at the ends thereof and a spring seat adjacent each of said journal boxes, vertical lateral flanges merging with the top chord of said structure and the top of the journal box on opposite sides of the adjacent spring seat, a resilient member superposed on said side frame structure and having its ends positioned on said spring seats, a bolster having a bifurcated end with spaced jaws receiving said member and positioned thereon at spaced points, shoulders on said bolster end, said member comprising a plurality of leaves of uniform cross-section and varying length and a single leaf of diminished cross-sectional area, said single leaf having abutment means adapted to engage said shoulders for transmission of thrusts between said bolster and said member and a brake hanger bracket of L section integrally formed on said side frame structure intermediate the ends thereof, one leg of said L being reflanged and merged with the top chord of said structure to form emergency stop means for said member.

2. In a four wheel railway truck, spaced side frame structures of generally arcuate shape and box section with integrally formed journal boxes at the ends thereof, spring seats formed on said side frame structures adjacent said journal boxes, a resilient member spanning the seats of each frame and free of engagement with said frame structure therebetween, a bolster superposed upon said resilient member and abutting means on said bolster and said member whereby lateral and longitudinal thrusts are transmitted therebetween, each of said side frames having stop means intermediate said spring seats adapted to have engagement with the associated member upon emergency loading thereof, said side frames having spaced brake hanger brackets intermediate their ends, each of said brackets having an L section, one leg of said L being reflanged and merged with the top chord of the side frame structure to form said stop means.

3. In a four wheel railway truck, a side frame structure of generally arcuate shape and box section having integrally formed journal boxes at the ends thereof and a spring seat adjacent each of said journal boxes, vertical lateral flanges merging with the top chord of said structure and the top of each journal box on opposite sides of the adjacent spring seat, a resilient member superposed on said side frame structure and having its ends positioned on said spring seats, a bolster having a bifurcated end with spaced jaws receiving said member and positioned thereon at spaced points, and shoulders on said bolster end, said member comprising a plurality of leaves of uniform thickness and varying length and a single relatively thin leaf having abutment means intermediate its ends adapted to engage said shoulders, whereby thrusts may be transmitted from said bolster to said member through said thin leaf, said side frame structure having intermediate its ends an integrally formed brake hanger bracket of L section, one leg of said L being reflanged and merged with the top chord of said structure to form emergency stop means for said member.

4. In a four wheel railway truck, a side frame of generally arcuate shape and box section with integrally formed journal boxes at the ends thereof, the top chord of said frame being widened and reflanged to form spaced vertical flanges merging with the tops of said journal boxes and defining the lateral walls of spring seats adjacent said journal boxes, a vertical wall joining said flanges adjacent each of said journal boxes, the top walls of said boxes being extended to merge with said vertical walls, a resilient member composed of a plurality of units superposed on said frame and having its ends positioned in said seats, and a bolster having a bifurcated end with spaced jaws receiving said member and positioned thereon at spaced intermediate points, and abutting means on said bolster and one of said units for transmitting longitudinal thrusts therebetween, said side frame having intermediate its ends spaced brake hanger brackets of L section, one leg of said L being reflanged and merged with the top chord of said side frame to form emergency stop means for said member.

5. In a four wheel railway truck, a side frame structure of generally arcuate shape and box section having integrally formed journal boxes at the ends thereof and a spring seat adjacent each of said journal boxes, vertical lateral flanges merging with the top chord of said structure and the top of each journal box on opposite sides of the adjacent spring seat, a resilient member superposed on said side frame structure and having its ends positioned on said spring seats, a bolster having a bifurcated end with spaced jaws receiving said member and positioned thereon at spaced points, and shoulders on said bolster end, said member comprising a plurality of leaves of uniform cross-section and varying length and a single leaf of diminished cross-sectional area, said single leaf only having abutment means adapted to engage said shoulders for transmission of thrusts between said bolster and said member, said diminished cross-sectional area permitting said single leaf to be flexed through the normal range of deflection of said resilient member with a reduced stress as compared with other of said leaves, whereby said single leaf may support the additional stresses resulting from said abutment without overloading.

6. In a four wheel railway truck, a side frame structure of generally arcuate shape and box section having integrally formed journal boxes at the ends thereof and a spring seat adjacent each of said journal boxes, vertical lateral flanges at each end of said frame merging with the top chord of said structure and the top of the journal box on opposite sides of the adjacent spring seat, a resilient member superposed on said side frame structure and having its ends positioned on said spring seats, a bolster having a bifurcated end with spaced jaws receiving said member and positioned thereon at spaced points, and shoulders on said bolster ends, said member comprising a plurality of leaves of uniform thickness and varying length and a single relatively thin leaf only having abutment means intermediate its ends adapted to engage said shoulders, whereby thrusts may be transmitted from said bolster to said member through said thin leaf, said relatively thin leaf being flexible through the normal bending range of said resilient member with a reduced stress as compared with other of said leaves, whereby said thin leaf may support said abutment means without undue stress concentration.

7. In a four wheel railway truck, spaced side frames of generally arcuate form and box section including integrally formed journal boxes and spring seats adjacent said boxes, supporting wheel and axle assemblies, a semi-elliptic spring associated with each side frame and having its ends supported on said seats and being free of other vertical support at intermediate points under normal loading conditions, means on said side frames underlying said springs and adapted to engage therewith under conditions of abnormal loading, a bolster having its ends superposed respectively on said springs, and abutment means on each end of said bolster engaging a single leaf of the adjacent spring for transmitting longitudinal thrusts therebetween, said single leaf having a relatively small cross-sectional area as compared with other leaves of said spring, whereby said single leaf may be flexed through the normal range of bending of said spring with a lesser stress resulting from said bending as compared with said other leaves.

8. In a four wheel railway truck, spaced side frames of generally arcuate form and box section with integrally formed journal boxes and spring seats adjacent said boxes, supporting wheel and axle assemblies, a semi-elliptic spring associated with each side frame and freely supported at its opposite ends on said seats respectively and without other vertical support at intermediate points, each of said springs being composed of a plurality of leaves of generally uniform cross section and a single relatively thin leaf, a bolster having its opposite ends supported on said springs respectively, and abutment means on said thin leaf and said bolster for transmitting lateral thrusts between said bolster and said springs, said thin leaf being flexible through the normal bending range of said spring with a lesser stress resulting from said bending than other leaves of said spring, whereby said thin leaf may support said abutment means without undue stress concentration therefrom.

ALFRED H. OELKERS.